(12) United States Patent
Lee

(10) Patent No.: US 11,855,510 B2
(45) Date of Patent: Dec. 26, 2023

(54) DRIVE MOTOR FOR VEHICLE

(71) Applicants: HYUNDAI MOTOR COMPANY, Seoul (KR); KIA CORPORATION, Seoul (KR)

(72) Inventor: Jae Hyeon Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 158 days.

(21) Appl. No.: 17/307,445

(22) Filed: May 4, 2021

(65) Prior Publication Data
US 2022/0060080 A1   Feb. 24, 2022

(30) Foreign Application Priority Data
Aug. 18, 2020 (KR) .................. 10-2020-0103296

(51) Int. Cl.
*H02K 5/20* (2006.01)
*H02K 9/19* (2006.01)
*H02K 7/00* (2006.01)

(52) U.S. Cl.
CPC .............. *H02K 5/20* (2013.01); *H02K 7/003* (2013.01); *H02K 9/19* (2013.01)

(58) Field of Classification Search
CPC ............ H02K 5/20; H02K 7/003; H02K 9/19
See application file for complete search history.

(56) References Cited

U.S. PATENT DOCUMENTS

| | | | | |
|---|---|---|---|---|
| 8,916,997 B2* | 12/2014 | Kirkley, Jr. | .............. | H02K 1/32 |
| 2015/0280525 A1* | 10/2015 | Rippel | | |
| 2018/0115219 A1* | 4/2018 | Moon | ...................... | H02K 9/00 |
| 2019/0249765 A1* | 8/2019 | Ito | ........................... | B60K 1/00 |

FOREIGN PATENT DOCUMENTS

| | | | | |
|---|---|---|---|---|
| CN | 109256902 A | * | 1/2019 | .............. H02K 9/19 |
| JP | 2016163399 A | * | 9/2016 | |
| KR | 10-2019-0035095 A | | 4/2019 | |

OTHER PUBLICATIONS

CN-109256902-A_translate (Year: 2019).*
JP-2016163399-A_translate (Year: 2016).*

* cited by examiner

*Primary Examiner* — Tulsidas C Patel
*Assistant Examiner* — Mohammed Ahmed Qureshi
(74) *Attorney, Agent, or Firm* — LEMPIA SUMMERFIELD KATZ LLC

(57) ABSTRACT

A drive motor for vehicles includes: a stator; a rotor rotatably disposed inside the stator; a hollow shaft disposed inside the rotor, configured to be rotatable with the rotor and including a plurality of through-holes; and a housing configured to accommodate the stator, the rotor, and the hollow shaft, and including a channel, wherein the channel is formed in an inner wall of the housing and is configured to allow an upper side of the inner wall and an interior of the hollow shaft to communicate with each other and allow oil flow therein.

19 Claims, 5 Drawing Sheets

FIG. 1 "PRIOR ART"

DRIVE MOTOR FOR VEHICLE

CROSS-REFERENCE TO RELATED APPLICATION

The application claims priority to and the benefit of Korean Patent Application No. 10-2020-0103296, filed on Aug. 18, 2020, the entire contents of which are incorporated herein by reference.

FIELD

The present disclosure relates to a drive motor for a vehicle.

BACKGROUND

The statements in this section merely provide background information related to the present disclosure and may not constitute prior art.

"Eco-friendly Vehicle (EV)" is a collective term for vehicles mounted with a rechargeable high-voltage large capacity battery, including a hybrid electric vehicle (HEV), a plug-in hybrid electric vehicle (PHEV), a fuel cell electric vehicle (FCEV), and so on.

A drive motor plays a major role in driving the eco-friendly vehicle. The drive motor has an efficiency of about 90% due to loss caused by heat, wind, sound, etc. Heat loss, which accounts for about 25% of the total loss, occurs particularly when the temperature of the drive motor is increased. In case the drive motor is heated over a threshold temperature which is an upper limit of a stable operating temperature of the drive motor, the drive motor is overheated and burning of coils around a stator of the drive motor or demagnetization of a permanent magnet in a rotor may occur. Consequently, an appropriate cooling system is being provided in the drive motor such that the drive motor operates below the threshold temperature, and improvements in cooling performance and efficiency of the drive motor are ceaselessly pursued to achieve size reduction and output increase.

A drive motor may be cooled by water, air or oil depending on a type of cooling liquids. Also, the drive motor may be cooled directly or indirectly based on presence of contact. Recently, direct cooling using oil is increasingly utilized in cooling the drive motor as importance in cooling capacity of the drive motor grows with increasing demand in high-performance drive motors.

Based on injection types, the direct oil cooling can include an axial scatter type which uses rotation of the drive motor and a type where the oil is transferred under pressurization by an electric oil pump (EOP). In recent years, increased demand on better cooling capability has led to combined applications of the former and the latter where a stator is cooled using the oil transferred under pressurization by EOP and a rotor is cooled by scattering oil from a motor shaft.

Research and development on the drive motor to improve cooling performance is actively underway for a drive motor cooling structure that enables both cost reductions and improved cooling performance.

The foregoing is intended merely to aid in the understanding of the background of the present disclosure, and is not intended to mean that the present disclosure falls within the purview of the related art that is already known to those skilled in the art.

SUMMARY

The present disclosure provides a drive motor for vehicles having excellent cooling performance.

The present disclosure provides a drive motor for vehicles having a simple structure while having excellent cooling performance.

The present disclosure provides a drive motor for vehicles capable of providing improved traveling performance.

The present disclosure provides a drive motor for vehicles capable of inhibiting demagnetization of a permanent magnet of a rotor.

One form of the present disclosure provides a drive motor for a vehicle, the drive motor comprising: a stator; a rotor rotatably disposed inside the stator; a hollow shaft disposed inside the rotor and configured to be rotatable with the rotor and including a plurality of through-holes; and a housing configured to accommodate the stator, the rotor, and the hollow shaft and including a channel, wherein the channel is formed in an inner wall of the housing and is configured to allow an upper side of the inner wall and an interior of the hollow shaft to communicate with each other and allow oil flow therein.

Another form of the present disclosure provides a drive motor for a vehicle, the drive motor comprising: a stator having a coil wound therearound; a rotor rotatably disposed inside the stator and including a plurality of permanent magnets disposed therearound; a hollow shaft disposed inside the rotor, configured to be rotatable with the rotor, and including a plurality of through-holes formed at a predetermined distance apart along a circumference of the hollow shaft; and a housing configured to accommodate the stator, the rotor, and the hollow shaft and including a channel, wherein the channel is formed in an inner wall of the housing and is configured to allow an upper side of the inner wall and an interior of the hollow shaft to communicate with each other and allow oil flow therein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
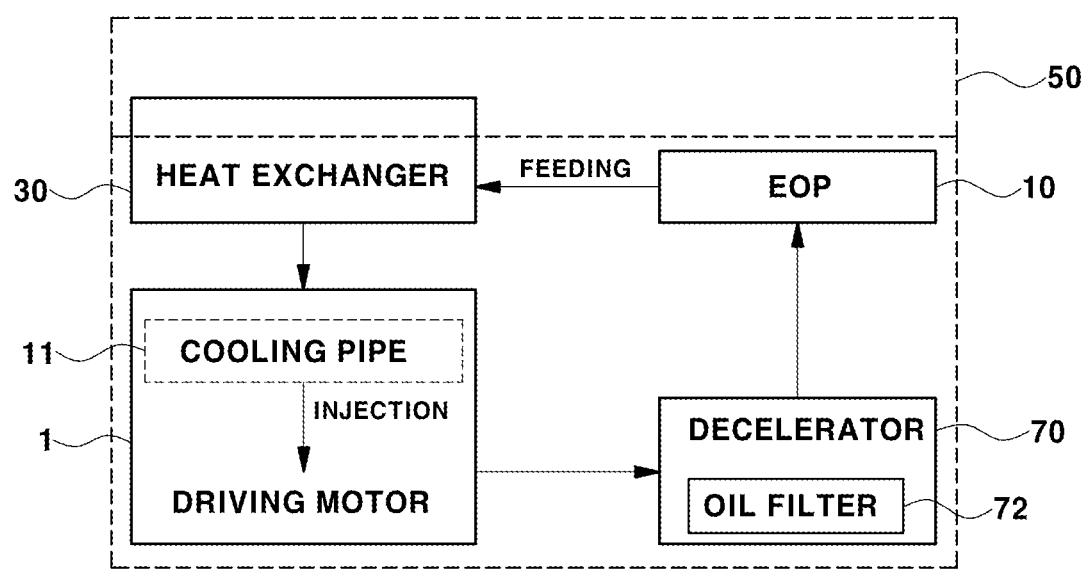
FIG. 1 is a view showing a circulation process of oil used to cool a drive motor for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

As described above, a drive motor 1 may be cooled by oil fed from an EOP, and a process in which the drive motor 1 is cooled in the above manner will be described with reference to FIG. 1.

As oil is fed from the EOP 10, oil circulation is commenced. The oil exchanges heat with a coolant of a cooling system 50 of a vehicle in a heat exchanger 30, and the temperature of the oil decreases. Then the driver motor 1 is cooled by the oil injected through a cooling pipe 11 of the drive motor 1. After cooling the drive motor 1, the oil moves to a speed reducer 70 where impurities are removed from the oil through an oil filter 72 provided in the speed reducer 70 and returns to the EOP 10. This circulation process is repeated.

In general, the oil is injected to a coil which is a main heat generation portion of the drive motor. In this type of oil transfer under pressurization, a stator is satisfactorily cooled. However, cooling of a rotor may be insufficient unless the aforementioned scatter type is adopted. When the rotor is not sufficiently cooled, thermal deformation may occur; for example, a permanent magnet in the rotor may be demagnetized or molding may be broken.

A temperature sensor for measuring temperature of the drive motor is commonly equipped in the coil of the stator, which makes it difficult to measure the temperature of the rotor, and thermal deformation tends to occur before a protection logic against excessive temperature, designed to protect the drive motor, comes into action.

In case the scatter type is involved as well, a separate cooling line is desired in order to supply oil from the EOP and an EOP with advanced capabilities may be desired to reflect pressure loss and the amount of oil in the separate line.

A certain amount of oil supplied to the drive motor when the drive motor is cooled is wasted without being used for cooling. According to a coil winding method of the drive motor, the coil is arranged obliquely at opposite ends of a stator core, particularly in case of a hairpin-type motor. As a result, oil injected from the cooling pipe strikes the oblique coil, whereby the oil flies outwards along the coil without permeating the coil, and an oil waste mishap occurs.

In this case, it was found that a larger amount of oil is wasted at the rear part of the drive motor than at the front part of the drive motor. The reason for this is that, compared to the front part being completely occupied by the coil, the rear part lacks spaces in the coil, through which the oil can penetrate due to a molding structure and insulation sheets. As a result, the injected oil bounces off the coil and flies toward a housing, whereby the actual amount of oil used for cooling becomes less than the amount of oil that is supplied, and, therefore, cooling efficiency is reduced.

The present disclosure provides a cooling structure configured to recover oil wasted at the rear part of the drive motor without being used and to use the recovered oil by oil scattering via the motor shaft.

Figure 2:
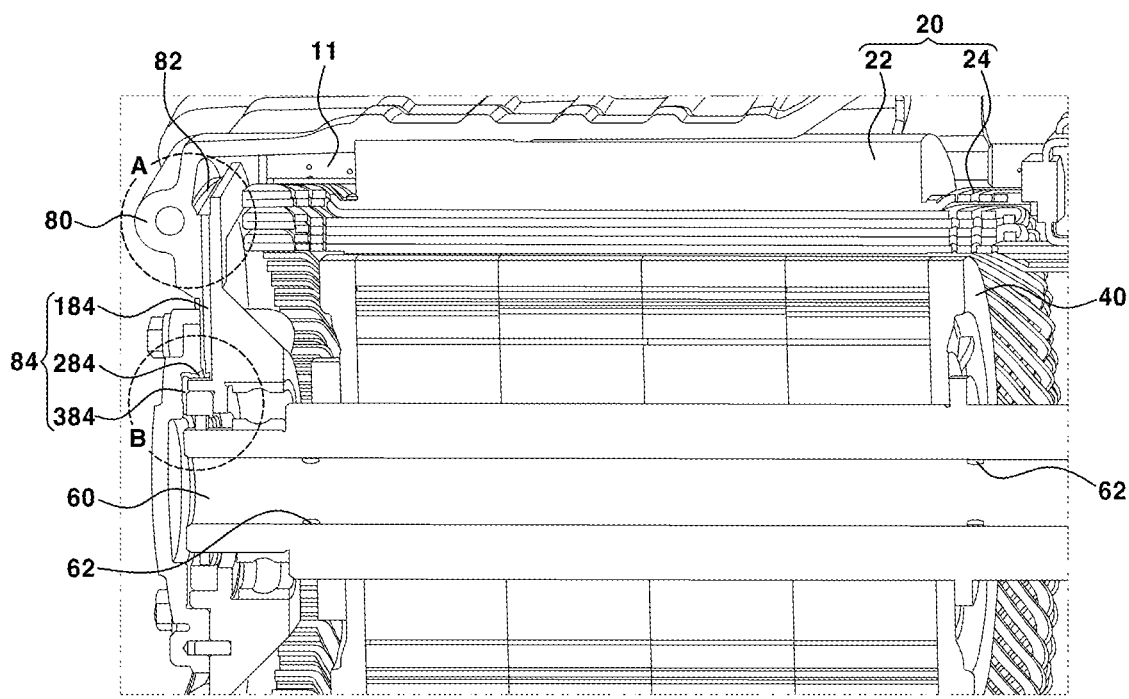
FIG. 2 is a sectional view of a drive motor for a vehicle according to the present disclosure.

FIG. 2 is an axial cross-sectional view of a drive motor for a vehicle according to the present disclosure.

Referring to FIG. 2, the drive motor 1 for a vehicle according to the present disclosure includes a stator 20, a rotor 40, a hollow shaft 60, and a housing 80.

The stator 20 includes a stator core 22 and a coil 24 wound around the stator core 22.

The rotor 40 is rotationally disposed radially inside the stator 20 and includes a rotor core and permanent magnets formed at the rotor core.

The hollow shaft 60 is positioned radially inside the rotor 40 and configured to rotate with the rotor 40. The hollow shaft 60 is rotatably coupled to the housing 80 via bearings (not shown). The end of the hollow shaft 60 is open, and a certain gap is arranged between the end of the hollow shaft 60 and the housing 80.

A through-hole 62 is made in the hollow shaft 60. The through-hole 62 serves as a scattering hole in the scatter type. The through-hole 62 allows communication between the inside and the outside of the hollow shaft 60. A plurality of through-holes may be arranged around the hollow shaft 60 with a predefined distance in between. More specifically, the through-holes 62 may be placed in radial alignment with the coil 24 and the rotor 40.

The housing 80 accommodates the stator 20, the rotor 40, and the hollow shaft 60 and is coupled to the hollow shaft 60 via the bearings. In one form of the present disclosure, the housing 80 includes a collector 82 and a channel 84. The collector 82 and the channel 84 may be formed in the inner wall of the housing 80.

Figure 3:
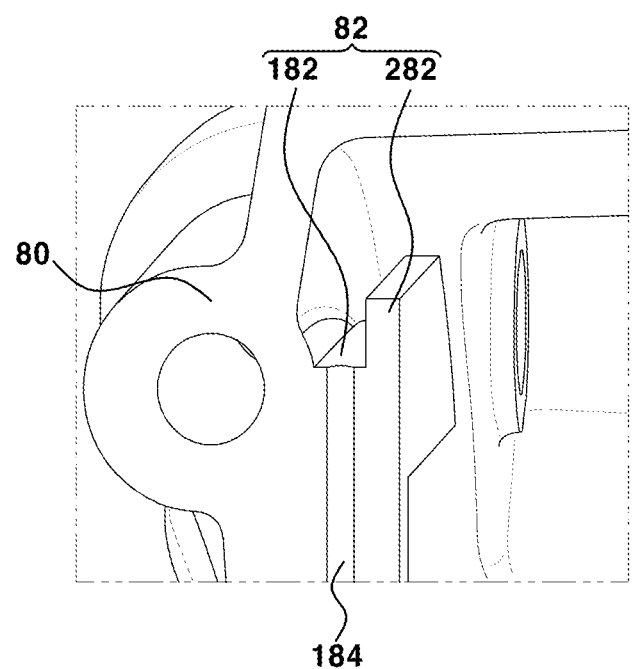
FIG. 3 is an enlarged view of part A of FIG. 2.

As shown in FIG. 3, the collector 82 is concavely formed in the upper side of the housing. In one form of the present disclosure, the collector 82 includes a concave portion 182 and a protruding portion 282.

The concave portion 182 and the protruding portion 282 form a receiving space having an open upper part and serve as the collector 82 configured to collect oil bounced off the coil 24 and wasted. The concave portion 182 protrudes from the inner surface or the inner wall of the upper side of the housing 80 approximately in a horizontal direction, and the protruding portion 282 extends from the concave portion 182 approximately in an upward direction.

The channel 84 is designed to convey the oil collected by the collector 82 to the hollow shaft 60 for axial scattering. The channel 84 extends from the collector 82 toward a central portion of the housing and allows the collector 82 and the hollow shaft 60 to communicate with each other. The channel 84 may be formed along the inner surface of the housing 80 in a vertical direction. In one form of the present disclosure, the channel 80 includes a first dropping portion 184, a switching channel 284, and a second dropping portion 384.

Figure 4:
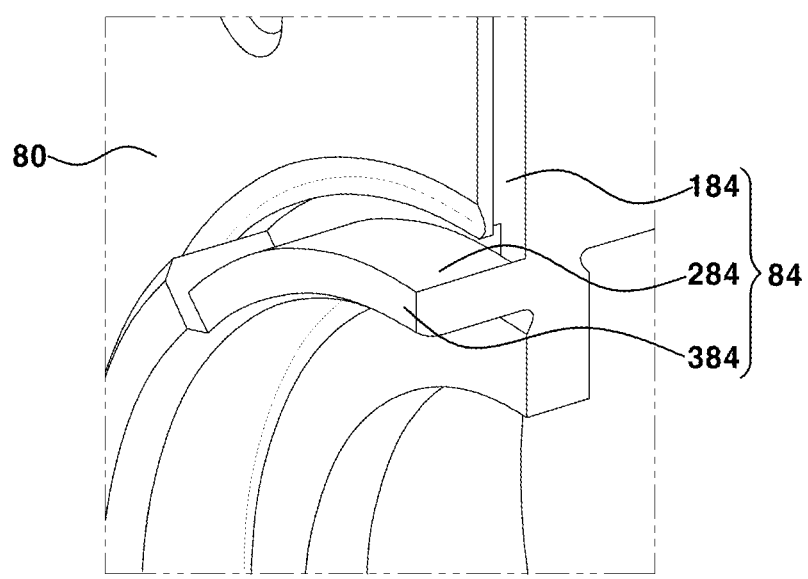
FIG. 4 is an enlarged view of part B of FIG. 2.

Referring to FIG. 4, the first dropping portion 184 is arranged such that the first dropping portion 184 directs approximately in a downward direction or in a radially inward direction along the inner wall of the housing 80. The switching channel 284 extends from the first dropping portion 184 to change the flow path to the axial direction, that is, from an upward-downward to a leftward-rightward direction, and at the same time to extend the flow path along the circumference of the hollow shaft 60. The switching channel 284 further extends in an axial direction and a circumferential direction of the hollow shaft 60 at the same time such that the first dropping portion 184 heads in a horizontal direction by switching from a vertical direction. The switching channel 284 is configured to communicate with the hollow shaft 60. In addition, the switching channel 284 may include a second dropping portion 384 extending from the switching channel 284 in the downward direction and configured to communicate with the hollow shaft 60. In one form of the present disclosure, the second dropping portion 384 is configured to communicate with the open end of the hollow shaft 60.

Figure 5:
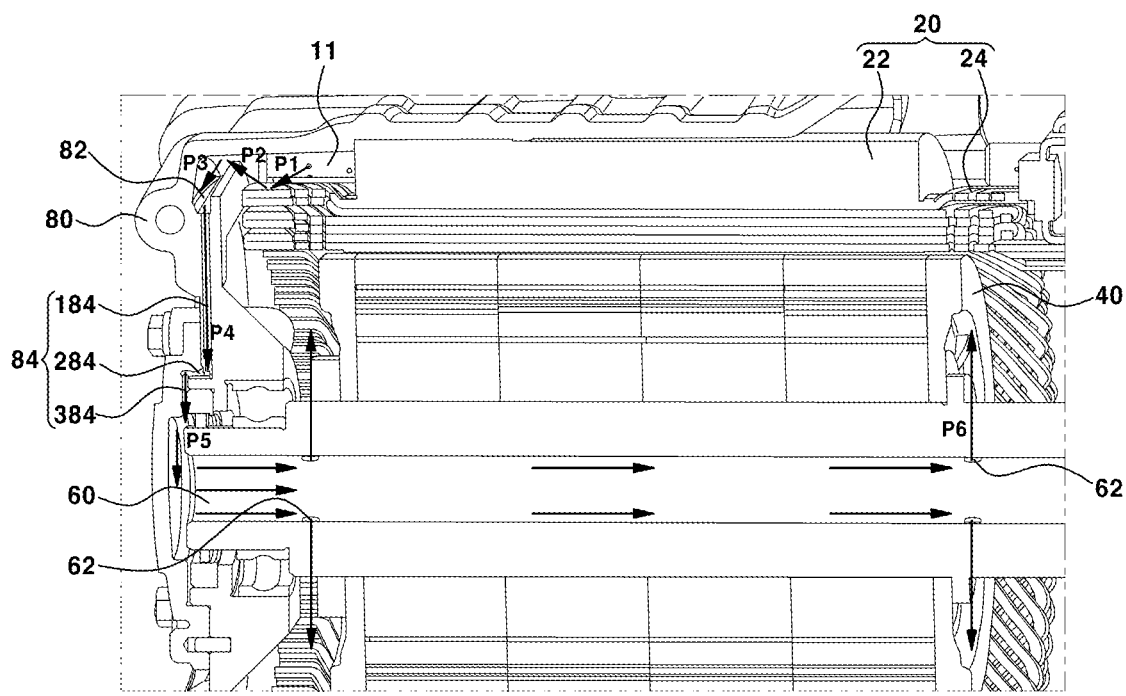
FIG. 5 is a sectional view of the drive motor for a vehicle according to the present disclosure, showing an oil flow path.

A process of cooling the drive motor according to the present disclosure will be described with reference to FIG. 5.

Oil fed from the EOP is injected to the drive motor 1 through the cooling pipe 11 (path P1). In one form of the present disclosure, the cooling pipe 11 is provided at the upper side of the housing 80, is configured to inject oil toward the lower side of the housing 80, and is configured to extend in the axial direction of the drive motor in order to inject oil to the front part and the rear part of the drive motor. In particular, the oil is configured to be directed to the coil 24. Some of the injected oil permeates into a gap between the coil portions and cools the coil 24, and some of the injected oil bounces toward the housing 80 without permeating into the gap between the coil portions (path P2). The bounced oil collides with the housing 80 and then flows downwards along the inside of the housing 80 or collides with the ceiling of the housing 80 and then drops (path P3). The oil flowing along the path P3 is collected in the collector 82. The oil collected in the collector 82 flows along the first dropping portion 184 (path P4) and flows along the second dropping portion 384 via the switching channel 284 and to the hollow shaft 60 (path P5).

Rotation of the hollow shaft 60 causes the oil to scatter through the through-holes 62, whereby the rotor 40 is cooled by axial scattering, and the coil 24 of the stator 20 is additionally cooled (path P6).

In the present disclosure, oil can be supplied to the hollow shaft 60 using the force of a fluid generated by a height difference based on gravity and Bernoulli's principle without improvement or change in the EOP capabilities. According to the present disclosure, the oil that flies off to the housing 80 can be utilized using the axial scattering such that cooling of the rotor is achieved with the same amount of oil and the same EOP capabilities, as well as additional cooling for the stator.

The drive motor for a vehicle having the cooling structure described above provides excellent cooling performance. In particular, it is possible to greatly improve drive motor cooling performance without using a greater amount of oil. Oil injected from the cooling pipe and wasted as the result of collision with the coil is employed again for axial scattering, whereby it is possible to supply a larger amount of oil in order to cool the rotor and the stator under the same flow rate condition. The reason for this is that, although the same flux is maintained by the EOP, re-utilization of the wasted oil through axial scattering allows the rotor, as well as the stator coil, to be additionally cooled.

Also, when the amount of oil that is supplied from the EOP increases due to an increase in the temperature of the drive motor, the amount of oil wasted after collision with the coil also increases. Then the amount of oil that can be reused to cool the inner side of the stator and the rotor also increases through axial scattering, whereby cooling performance can improve under excess temperature conditions.

The drive motor for a vehicle according to the present disclosure may improve traveling performance of the vehicle. Over-temperature protection logic is employed as a temperature sensor senses over-temperature of the drive motor due to an increase in the temperature of the inside of the stator coil. Then the traveling performance of the vehicle diminishes due to output power derating of the drive motor. According to the present disclosure, however, the inside of the stator and the rotor are additionally cooled by oil that is reused although the amount of oil that is injected to the stator is identical under the same oil supply amount condition, whereby restraints from the output power derating can be alleviated, thereby achieving more stable traveling performance.

In addition, according to the present disclosure, demagnetization of the permanent magnet in the rotor of the drive motor can be inhibited. Since oil wasted as the result of collision with the coil is collected to cool the rotor, it is possible to avoid danger of demagnetization of the permanent magnet due to an increase in the temperature of the rotor and to reduce maintenance costs incurred by breakdown due to demagnetization.

According to the present disclosure, it is possible to reduce the cost of the EOP and to increase possible traveling distance. When a conventional axial scattering structure is used, additional load is desired for the EOP in order to supply oil to a separate line for scattering. In case output of the EOP is insufficient due to pressure loss in the additional line, an EOP having higher capacity may be desired. According to the present disclosure, however, oil is supplied through reuse of the wasted oil and the pressure of oil without additional load of the EOP or change of the EOP capacity. Consequently, cooling performance may be improved in the same EOP or under the same oil supply amount conditions, and an EOP having a lower capacity may be used or lower load of the EOP may be used for the same cooling performance, whereby it is possible to efficiently increase potential traveling distance as the result of reduction in the cost of the EOP and reduction in the electronic loads due to reduction of the load of EOP.

As is apparent from the foregoing, according to the present disclosure, it is possible to provide a drive motor for a vehicle having excellent cooling performance.

According to the present disclosure, it is possible to provide a drive motor for a vehicle having a simple structure while having excellent cooling performance.

According to the present disclosure, it is possible to provide a drive motor for a vehicle capable of providing improved traveling performance.

According to the present disclosure, it is possible to provide a drive motor for a vehicle capable of inhibiting demagnetization of a permanent magnet of a rotor.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A drive motor for vehicles, the drive motor comprising:
   a stator;
   a rotor rotatably disposed inside the stator;
   a hollow shaft disposed inside the rotor, configured to be rotatable with the rotor and including a plurality of through-holes;
   a housing configured to accommodate the stator, the rotor, and the hollow shaft, and including a channel formed in an inner wall of the housing, wherein the channel is configured to allow an upper side of the inner wall and an interior of the hollow shaft to communicate with each other and allow oil flow therein, and wherein at least a part of the channel runs through the housing; and
   a cooling pipe disposed in the housing and configured to inject an oil toward a coil of the stator, wherein the housing further comprises a collector configured to receive the oil splashed from the coil and communicate with the channel.

2. The drive motor according to claim 1, wherein the collector is concavely formed in the upper side of the inner wall.

3. The drive motor according to claim 1, wherein the channel extends radially inwards in the housing from the collector along the inner wall.

4. The drive motor according to claim 3, wherein the hollow shaft includes an open end configured to communicate with the channel.

5. The drive motor according to claim 1, wherein the collector comprises:
   a concave portion protruding from the inner wall of the housing in a horizontal direction; and
   a protruding portion extending upward from the concave portion.

6. The drive motor according to claim 1, wherein the channel comprises:
   a first dropping portion formed at the inner wall of the housing and extending downward from the collector; and
   a switching channel extending from the first dropping portion in an axial direction and a circumferential direction of the hollow shaft and configured to switch a direction of the oil flowing from the first dropping portion.

7. The drive motor according to claim 6, wherein the switching channel further comprises a second dropping portion extending downward from the switching channel.

8. The drive motor according to claim 7, wherein the hollow shaft includes an open end configured to communicate with the second dropping portion.

9. The drive motor according to claim 8, wherein the oil introduced into an inside of the hollow shaft through the second dropping portion is scattered toward the rotor and the stator through the plurality of through-holes.

10. The drive motor according to claim 1, wherein the cooling pipe is provided at an upper side of the housing along an axial direction of the housing.

11. The drive motor according to claim 10, wherein the oil is transferred to the cooling pipe under pressure generated by an electric oil pump (EOP).

12. The drive motor according to claim 1, wherein the plurality of through-holes are configured to allow an inside and an outside of the hollow shaft to communicate with each other, and the plurality of through-holes are disposed along a circumference of the hollow shaft spaced apart from each other at a predetermined distance.

13. The drive motor according to claim 12, wherein the oil flows to an inside of the hollow shaft through the channel and is scattered toward the rotor and the stator through the plurality of through-holes.

14. A drive motor for a vehicle, the drive motor comprising:
   a stator including a coil wound therearound;
   a rotor rotatably disposed inside the stator and including a plurality of permanent magnets disposed therearound;
   a hollow shaft disposed inside the rotor, configured to be rotatable with the rotor, and including a plurality of through-holes spaced apart from each other at a predetermined distance apart along a circumference of the hollow shaft;
   a housing configured to accommodate the stator, the rotor, and the hollow shaft and including a channel formed in an inner wall of the housing, wherein the channel is configured to allow an upper side of the inner wall and an interior of the hollow shaft to communicate with each other and allow oil flow therein, and wherein at least a part of the channel runs through the housing; and
   a cooling pipe disposed in the housing and configured to inject an oil toward the coil, wherein the housing further comprises a collector configured to receive the oil splashed from the coil and communicate with the channel.

15. The drive motor according to claim 14, wherein the plurality of through-holes are positioned on the hollow shaft where the hollow shaft radially coincides with the coil or the plurality of permanent magnets.

16. The drive motor according to claim 15, wherein the oil is injected radially outwardly from the hollow shaft through the plurality of through-holes.

17. The drive motor according to claim 14, wherein the cooling pipe is provided at an upper side of the housing along an axial direction of the housing.

18. The drive motor according to claim 17, wherein the cooling pipe is configured to inject the oil into the housing such that the oil is injected toward the coil.

19. The drive motor according to claim 17, wherein the oil is transferred to the cooling pipe under pressure generated by an electric oil pump (EOP).

* * * * *